United States Patent
Honjo et al.

(10) Patent No.: US 7,544,338 B2
(45) Date of Patent: Jun. 9, 2009

(54) MERCURY REMOVAL SYSTEM AND MERCURY REMOVAL PROCESS

(75) Inventors: Shintaro Honjo, Hiroshima-ken (JP);
Kenichi Okada, Hiroshima-ken (JP);
Susumu Okino, Hiroshima-ken (JP);
Yasuhiro Takeuchi, Hiroshima-ken (JP);
Satoru Sugita, Hiroshima-ken (JP);
Yoshio Nakayama, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 134 days.

(21) Appl. No.: 11/609,867

(22) Filed: Dec. 12, 2006

(65) Prior Publication Data

US 2007/0202020 A1 Aug. 30, 2007

(30) Foreign Application Priority Data

Dec. 21, 2005 (JP) ............... 2005-367344

(51) Int. Cl.
*B01D 53/50* (2006.01)
*B01D 53/56* (2006.01)
*B01D 53/64* (2006.01)
*B01D 53/74* (2006.01)
*B01D 53/78* (2006.01)
*G05D 7/00* (2006.01)

(52) U.S. Cl. ............... 423/210; 423/239.1; 423/242.1; 423/243.08; 423/DIG. 5; 422/168; 422/169; 422/170; 422/171; 422/180; 422/105; 422/108; 422/111

(58) Field of Classification Search ............... 423/210, 423/239.1, 242.1, 243.08, DIG. 5; 422/168, 422/169, 170, 171, 177, 180, 105, 108, 111
See application file for complete search history.

(56) References Cited

U.S. PATENT DOCUMENTS

| 6,638,485 | B1 | 10/2003 | Iida et al. |
| 2003/0170159 | A1* | 9/2003 | Honjo et al. ............... 423/210 |
| 2003/0235525 | A1 | 12/2003 | Honjo |

(Continued)

FOREIGN PATENT DOCUMENTS

DE 4218672 C1 8/1993

(Continued)

OTHER PUBLICATIONS

EP Search Report for EP 06022824.4 dated Apr. 11, 2007.

*Primary Examiner*—Timothy C Vanoy
(74) *Attorney, Agent, or Firm*—Lowe, Hauptman, Ham & Berner, LLP

(57) ABSTRACT

Provided is a system for removing mercury from a mercury-containing exhaust gas, which contains a mercury chlorinating agent feed unit for feeding a mercury chlorinating agent to an flue exhaust gas containing nitrogen oxide, sulfur oxide and mercury, a reductive denitration unit for reducing the nitrogen oxide, and a desulfurization unit for removing the sulfur oxide, characterized in that the mercury chlorinating agent feed unit further comprises a heating unit for heating a non-gaseous agent for mercury chlorination which is in the non-gaseous form under normal temperature and normal pressure or a gasifying unit for obtaining a gaseous agent for mercury chlorination from the non-gaseous agent for mercury chlorination. The present invention makes it possible to provide a mercury removal process and system which have high reliability and can be operated at a low cost.

11 Claims, 6 Drawing Sheets

U.S. PATENT DOCUMENTS

| | | |
|---|---|---|
| 2004/0202596 A1 | 10/2004 | Honjo |
| 2004/0223896 A1* | 11/2004 | Cooper et al. ............ 423/210 |
| 2005/0112042 A1* | 5/2005 | Honjo et al. ............ 423/210 |
| 2007/0202020 A1 | 8/2007 | Honjo et al. |

FOREIGN PATENT DOCUMENTS

| | | |
|---|---|---|
| EP | 0860197 A1 | 8/1998 |
| EP | 1316352 A1 | 6/2003 |
| EP | 1800734 A1 | 6/2007 |
| JP | 10-230137 A | 9/1998 |
| JP | 2001-198434 A | 7/2001 |
| JP | 2004-313833 A | 11/2004 |
| WO | 03076051 A1 | 9/2003 |
| WO | 2006/093026 A1 | 9/2006 |

* cited by examiner

//

US 7,544,338 B2

MERCURY REMOVAL SYSTEM AND MERCURY REMOVAL PROCESS

RELATED APPLICATION

The present application is based on, and claims priority from, Japanese Application Number 2005-367344, filed Dec. 21, 2005, the disclosure of which is hereby incorporated by reference herein in its entirety.

BACKGROUND OF THE INVENTION

1. Field of the Invention

The present invention relates to a mercury removal system and mercury removal process for removing mercury contained in a gas discharged from combustion equipment.

2. Background Art

Exhaust gases released when coal or heavy oil is burnt contain ash dust, $SO_x$ (sulfur oxides) and $NO_x$ (nitrogen oxides) and they sometimes contain metallic mercury.

For treating this metallic mercury, a variety of processes or apparatuses have recently been devised, used in combination with a denitration apparatus for reducing $NO_x$ and a wet desulfurization apparatus using an alkaline absorbing solution as a $SO_x$ absorber.

As a process for treating metallic mercury in an exhaust gas, a removal process using an adsorbent such as active carbon or selenium filter is known. It requires, however, a special adsorption-removal unit and hence is not suited for the treatment of a large volume of an exhaust gas, for example, discharged from a power plant.

As a method for treating metallic mercury in a large amount of an exhaust gas, proposed is a process comprising, in a flue, carrying out gas atomization of a chlorinating agent in a step upstream of a high temperature denitration apparatus, oxidizing (chlorinating) mercury on a denitration catalyst to convert it into water-soluble mercury chloride, and absorbing it in a wet desulfurization apparatus disposed downstream of the denitration apparatus (refer to, for example, Japanese Patent Provisional Publication No. 230137/1998)).

As a unit and technology for gas atomization into a flue, an $NH_3$ atomizer of a denitration apparatus has been put to practical use. A similar method can be employed for gas atomization of a chlorinating agent. Hydrogen chloride gas is however highly corrosive so that excessive addition of a chlorinating agent causes corrosion of a flue or downstream apparatuses in the system, resulting in the shortening of the plant life.

In order to prevent the influence of a chlorinating agent on the apparatus such as corrosive damage and to improve reliability, a system for measuring the mercury concentration of an exhaust gas after wet desulfurization by a mercury monitor and adjusting the feed amount of a chlorinating agent based on the mercury concentration after desulfurization has been proposed (refer to, for example, Japanese Patent Provisional Publication No. 2001-198434).

The feed amount of a chlorinating agent can be adjusted relatively easily when a high-purity hydrogen chloride gas is used directly as a chlorinating agent, but it is expensive and therefore is not economical for the treatment of a large amount of an exhaust gas.

In addition, there are no chlorinating agents that can be atomized directly at the operation temperature (350 to 420° C.) of a denitration apparatus. Even neutral salt slurry such as NaCl cannot be decomposed at the operation temperature of a denitration apparatus so that it is not only ineffective but also may presumably cause blockage.

SUMMARY OF THE INVENTION

An object of the present invention is to provide a highly reliable process and system capable of removing mercury at a low operation cost.

The present invention has been made to overcome the above-described problems. In the present invention, there is thus provided a mercury removal system from a mercury-containing exhaust gas, which is equipped with a mercury chlorinating agent feed unit for feeding a mercury chlorinating agent to an flue exhaust gas containing nitrogen oxide, sulfur oxide and mercury, a reductive denitration unit for reducing the nitrogen oxide, and a desulfurization unit for removing the sulfur oxide. This system is characterized in that the mercury chlorinating agent feed unit further has a heating unit for heating a non-gaseous agent for mercury chlorination which is in the non-gaseous form under normal temperature and normal pressure or a gasifying unit for obtaining a gaseous agent for mercury chlorination from the non-gaseous agent for mercury chlorination.

In the mercury removal system according to the present invention, the gasifying unit preferably uses, for gasification, compressed air heated to a predetermined temperature.

In the mercury removal system according to the present invention, the gasifying unit preferably uses, for gasification, a portion of the exhaust gas.

In the mercury removal system according to the present invention, the mercury chlorinating agent feed unit is preferably equipped further with a unit for diluting the gaseous agent for mercury chlorination.

The mercury removal system according to the present invention is preferably equipped further with a concentration measuring unit of the gaseous agent for mercury chlorination disposed upstream of the denitration unit in the flue; a calculation unit for calculating an initial concentration of the gaseous agent for mercury chlorination to be fed by the mercury chlorinating agent feed unit based on the concentration of the gaseous agent for mercury chlorination measured by the concentration measuring unit; and a control unit for controlling an amount of the non-gaseous agent for mercury chlorination to be fed into the flue based on the initial concentration calculated by the calculation unit.

In the mercury removal system according to the present invention, the gaseous agent for mercury chlorination is preferably ammonium chloride, an aqueous solution of hydrogen chloride or liquid chlorine.

The mercury removal system according to the present invention is preferably equipped further with a mercury concentration measuring unit disposed upstream or downstream of the desulfurization unit in the flue, a calculation unit for calculating an initial concentration of the gaseous agent for mercury chlorination to be fed by the mercury chlorinating agent feed unit based on the mercury concentration measured by the concentration measuring unit, and a control unit for controlling an amount of the non-gaseous agent for mercury chlorination to be fed into the flue based on the initial concentration calculated by the calculation unit.

Mercury concentration measuring unit 14 is shown in FIGS. 1, 2, 3, and 6.

The mercury removal process according to the present invention is a process of removing mercury from a mercury-containing exhaust gas, which comprises a step of feeding a mercury chlorinating agent to a flue exhaust gas containing nitrogen oxide, sulfur oxide and mercury, a reductive denitration step in the presence of a solid catalyst, and a wet desulfurization step using an alkaline absorbing solution. These steps are carried out in the order of being mentioned. This process is characterized in that the step of feeding a mercury chlorinating agent includes a step of heating or gasifying a non-gaseous agent for mercury chlorination which is in the non-gaseous form at normal temperature and normal pressure.

In the process of removing mercury from a mercury-containing exhaust gas according to the present invention, the step of feeding a mercury chlorinating agent includes a step of diluting the gaseous agent for mercury chlorination.

The mercury removal process according to the present invention is preferably equipped with a step of measuring the concentration of the gaseous agent for mercury chlorination disposed upstream of the desulfurization unit in the flue; a step of calculating an initial concentration of the gaseous agent for mercury chlorination to be fed by the mercury chlorinating agent feed unit based on the concentration of the gaseous agent for mercury chlorination measured above, and a step of controlling an amount of the non-gaseous agent for mercury chlorination to be fed into the flue based on the initial concentration calculated above.

The present invention can provide an exhaust gas treatment system which can use ordinarily employed metal materials for pipes, has long-term reliability and can be operated at a lower cost.

The mercury chlorinating agent feed unit in the mercury removal system of the present invention will next be described specifically based on accompanying drawings. In all the drawings, members having like function will be identified by like reference numerals. It should however be noted that the present invention is not limited to or by the embodiments described below.

DETAILED DESCRIPTION OF THE PREFERRED EMBODIMENTS

Figure 1:
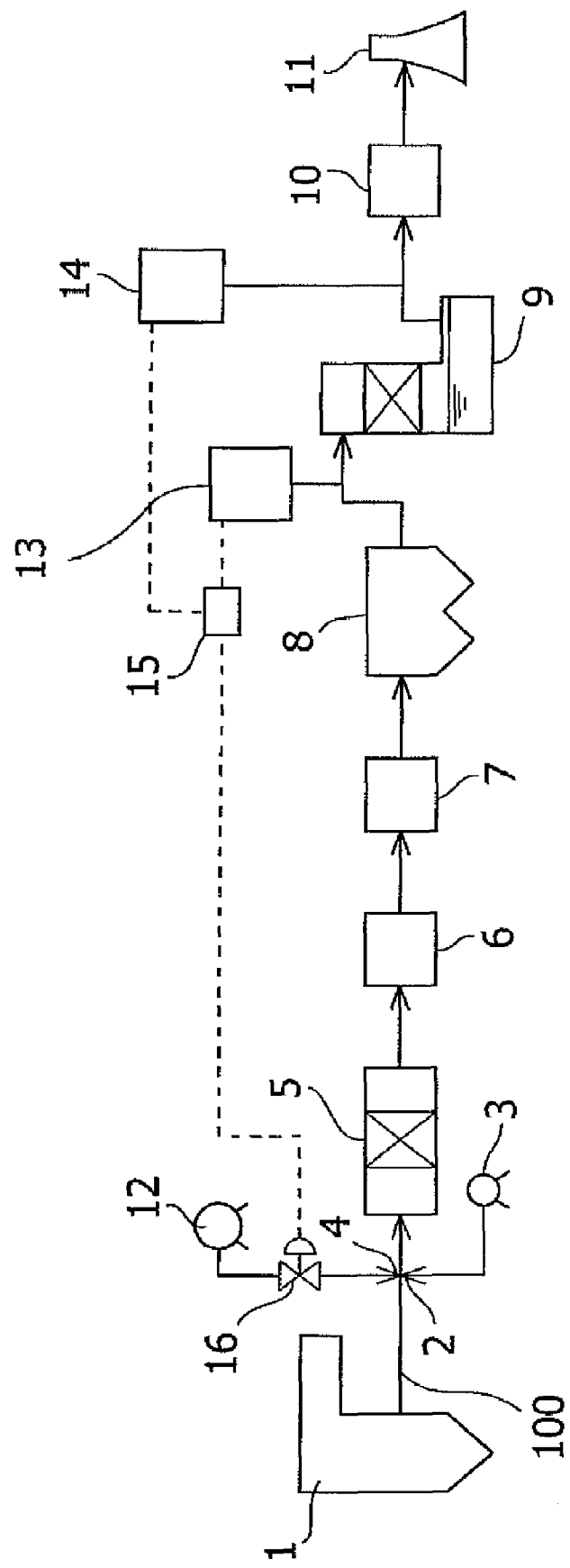
FIG. 1 illustrates an embodiment in which the mercury removal system of the present invention is incorporated in an exhaust gas treatment system.

The entire image of the exhaust gas treatment system including the mercury removal system of the present invention will next be described based on FIG. 1.

An exhaust gas containing NOx, SOx and mercury discharged from a boiler passes through a reductive denitration unit 5 for reducing the NOx, an air heater 6, a heat recovery unit 7 and a dust collector 8, is treated through a desulfurization unit for removing the SOx and a reheater 10, and then is discharged from a chimney 11.

An $NH_3$ injection site 2 is disposed upstream of the reductive denitration unit 5 and reduction of the NOx is performed by $NH_3$ fed from an $NH_3$ tank 3.

As illustrated in FIG. 1, the mercury removal system of the present invention may have, in addition to the above-described exhaust gas treatment system, a concentration measuring unit 13 of the gaseous agent for mercury chlorination disposed upstream of the desulfurization unit 9 in the flue; a calculation unit 15 for calculating an initial concentration of the gaseous agent for mercury chlorination to be fed by the mercury chlorinating agent feed unit based on the concentration of the gaseous agent for mercury chlorination measured by the concentration measuring unit; and a control unit 16 for controlling an amount of the non-gaseous agent for mercury chlorination to be fed into the flue based on the initial concentration calculated by the calculation unit. The gaseous/non-gaseous agent for mercury chlorination will be described later.

The concentration measuring unit of the gaseous agent for mercury chlorination may be disposed at any position as long as it is upstream of the desulfurization unit 9 and downstream of the mercury chlorinating agent injection site 4 because almost all the amount of the gaseous agent for mercury chlorination is collected by the desulfurization unit 9. If a narrow sampling tube is used for sampling the exhaust gas in the concentration measuring unit 13 of a gaseous agent for mercury chlorination, the concentration measuring unit is preferably placed downstream of the dust collector 8 but upstream of the desulfurization unit 9 because the tube tends to be clogged with dust and the like.

The mercury removal system of the present invention is preferably equipped further with a mercury concentration measuring unit disposed upstream or downstream of the desulfurization unit in the flue, a calculation unit 15 for calculating an initial concentration of the gaseous agent for mercury chlorination to be fed by the mercury chlorinating agent feed unit based on the mercury concentration measured by the concentration measuring unit, and a control unit 16 for controlling an amount of the non-gaseous agent for mercury chlorination to be fed into the flue based on the initial concentration calculated by the calculation unit.

The position to place the mercury concentration measuring unit is different, depending on which unit is employed, (I) a concentration measuring unit capable of determining the quantities of $Hg^0$ and $Hg^{2+}$ separately or (II) a concentration measuring unit of total Hg. The term $Hg^0$ as used herein means vaporized metallic mercury.

When the unit (I) is employed, it is located at any position insofar as it is downstream of the reductive denitration unit 5. The mercury concentration measuring unit is preferably be placed upstream of the inlet of the desulfurization unit, because an influence of a collection ratio at the desulfurization unit cannot be neglected when it is located at the outlet of the desulfurization unit. More preferably, the mercury concentration measuring unit should be placed at the outlet of the denitration unit at which the influence of the collecting effect by the dust collector can also be eliminated.

When the unit (II) is employed, it is disposed at the outlet of the desulfurization unit because even a change in composition ratio due to a change in oxidation ratio cannot be detected at the inlet of the desulfurization unit when neither component is collected at the dust collector.

The concentration of mercury contained in an exhaust gas in a flue usually ranges from 0.1 to 50 $\mu g/m^3$.

The amount of the non-gaseous agent for mercury chlorination can be controlled by calculating the initial concentration of the gaseous agent for mercury chlorination as described below based on the concentration measured by the concentration measuring unit of the gaseous mercury-chlorinating agent or mercury concentration measuring unit.

The feed amount of the non-gaseous agent for mercury chlorination is controlled so that the HCl concentration or $Cl_2$ concentration be a necessary concentration satisfying the $Hg^0$ oxidation performance in a predetermined hydrogen chloride gas or chlorine gas in the denitration unit.

When the unit (I) is employed, a catalyst oxidation ratio and concentration of each component satisfy the below-described relation. When the oxidation ratio becomes lower than any one of the calculated values, an increase in the concentration of $Hg^0$ or a reduction in the $Hg^{2+}$ concentration is detected. In order to give a predetermined oxidation ratio, the control is therefore conducted by increasing the atomization amount of a mercury chlorinating agent.

$$C_{Hg^0_{out}} = C_{Hg^0_{in}}(1 - \eta_{Hg^0_{ox}})$$

$$C_{Hg^{2+}_{out}} = C_{Hg^{2+}_{in}} + C_{Hg^0_{in}}\eta_{Hg^0_{ox}}$$

$C_{Hg^0_{in}}$ : $Hg^0$ concentration at the inlet of catalyst [μg/$m^3$N]

$C_{Hg^0_{out}}$ : $Hg^0$ concentration at the outlet of catalyst [μg/$m^3$N]

$C_{Hg^{2+}_{in}}$ : $Hg^{2+}$ concentration at the inlet of catalyst [μg/$m^3$N]

$C_{Hg^{2+}_{out}}$ : $Hg^{2+}$ concentration at the outlet of catalyst [μg/$m^3$N]

$\eta_{Hg^0_{ox}}$ : Catalyzed Hg oxidation ratio [−]

When the unit (II) is employed, the oxidation ratio of mercury on the catalyst and the concentration of Total Hg at the outlet of the desulfurization unit have the below-described relation supposing that $Hg^{2+}$ is collected at a certain collecting ratio and $Hg^0$ is not collected. An increase in the total Hg concentration is detected when the catalyzed oxidation ratio decreases. Then, the oxidation ratio is controlled to attain a predetermined value by increasing the atomization amount of a mercury chlorinating agent.

$$\begin{aligned}C_{T-Hgbsout} &= C_{Hg^0_{out}} + C_{Hg^{2+}_{out}}(1 - \eta_{Hg^{2+}_{abs}}) \\ &= C_{Hg^0_{in}}(1 - \eta_{Hg^0_{ox}}) + (C_{Hg^{2+}_{in}} + C_{Hg^0_{in}}\eta_{Hg^0_{ox}})(1 - \eta_{Hg^{2+}_{abs}}) \\ &= C_{Hg^0_{in}}(1 - \eta_{Hg^0_{ox}}\eta_{Hg^{2+}_{abs}}) + C_{Hg^{2+}_{in}}(1 - \eta_{Hg^{2+}_{abs}})\end{aligned}$$

$C_{T-Hgabsout}$: Total Hg concentration at the outlet of desulfurization unit [μg/$m^3$N]

$\eta_{Hg^{2+}_{abs}}$: Ratio of collected Hg at desulfurization unit [−]

It is reported that in spite of the mercury collecting performance at the desulfurization unit, $Hg^{2+}$ absorbed in an absorption tower is re-reduced to $Hg^0$ by the action of sulfite ions accumulated in the absorption tower and re-volatilized from the absorption tower. Such a phenomenon can be suppressed by controlling the redox potential of an absorbing solution as described in Japanese Patent Provisional Publication No. 2004-313833.

Control by the concentration measuring unit of hydrogen chloride or chlorine gas or the mercury concentration measuring unit can be performed separately or they can be used in combination as a cascade control (using one of them as a master control parameter and the other one as a slave parameter).

Atomization is conducted while adjusting the initial concentration of HCl in the flue to from 1 to 500 ppm, preferably from 10 to 100 ppm, or that of $Cl_2$ to from 0.1 to 100 ppm, preferably from 1 to 10 ppm. When the concentration is excessively high, economic efficiency is lost owing to cost increase.

A ratio of the molar concentration of Hg to the molar concentration of a mercury chlorinating agent to be fed to the exhaust gas (which may also be called "the initial concentration of hydrogen chloride or chlorine gas") [Hg molar concentration/molar concentration of hydrogen chloride or chlorine gas] is preferably 0.001 or less, more preferably 0.0001 or less when a monovalent chlorinated product such as hydrogen chloride gas or $NH_4Cl$ powder is employed. The preferable lower limit of an Hg molar concentration/initial concentration of hydrogen chloride gas ratio is 0.00001 from the viewpoint of economic efficiency. An Hg molar concentration/initial concentration of a chlorine gas is preferably 0.01 or less, more preferably 0.001 or less. The preferable lower limit of it is 0.0001 from the viewpoint of economic efficiency.

The mercury removal system according to the present invention is equipped with, as the mercury chlorinating agent feed unit, a heating unit for heating a non-gaseous agent for mercury chlorination which is in the non-gaseous form at normal temperature and normal pressure or a gasifying unit for obtaining a gaseous agent for mercury chlorination from a non-gaseous agent for mercury chlorination.

The term "normal temperature and normal pressure" as used herein means 25° C. and 1 atmospheric pressure.

The term "non-gaseous agent for mercury chlorination" as used herein means a chlorinated product in the solid form, a solid compound capable of generating a chlorinated product, a chlorinated product solution in which a chlorinated product has been dissolved in a solvent at a vapor pressure of 0.1 MPa or less, or liquid chlorine. As the non-gaseous chlorinated product, a chlorinated product in the solid form such as ammonium chloride [$NH_4Cl$] powder, ammonium hypochlorite or ammonium chlorite, or a solution of a chlorinated product in a solvent such as aqueous solution of hydrogen chloride [aqueous HCl solution], aqueous solution of chlorous acid, or aqueous solution of perchloric acid can be used.

The heating or gasifying unit is, as illustrated in FIG. 1, disposed upstream of the reductive denitration unit 5 and connected to the mercury chlorinating injection site 4. The mercury chlorinating agent fed from the mercury chlorinating injection site 4 reacts with mercury in an exhaust gas at the reductive denitration unit 5 and generates $HgCl_2$.

The mercury removal system according to the present invention can be operated at a reduced cost by using an inexpensive non-gaseous agent for mercury chlorination instead of a high purity hydrogen chloride gas.

Figure 2:
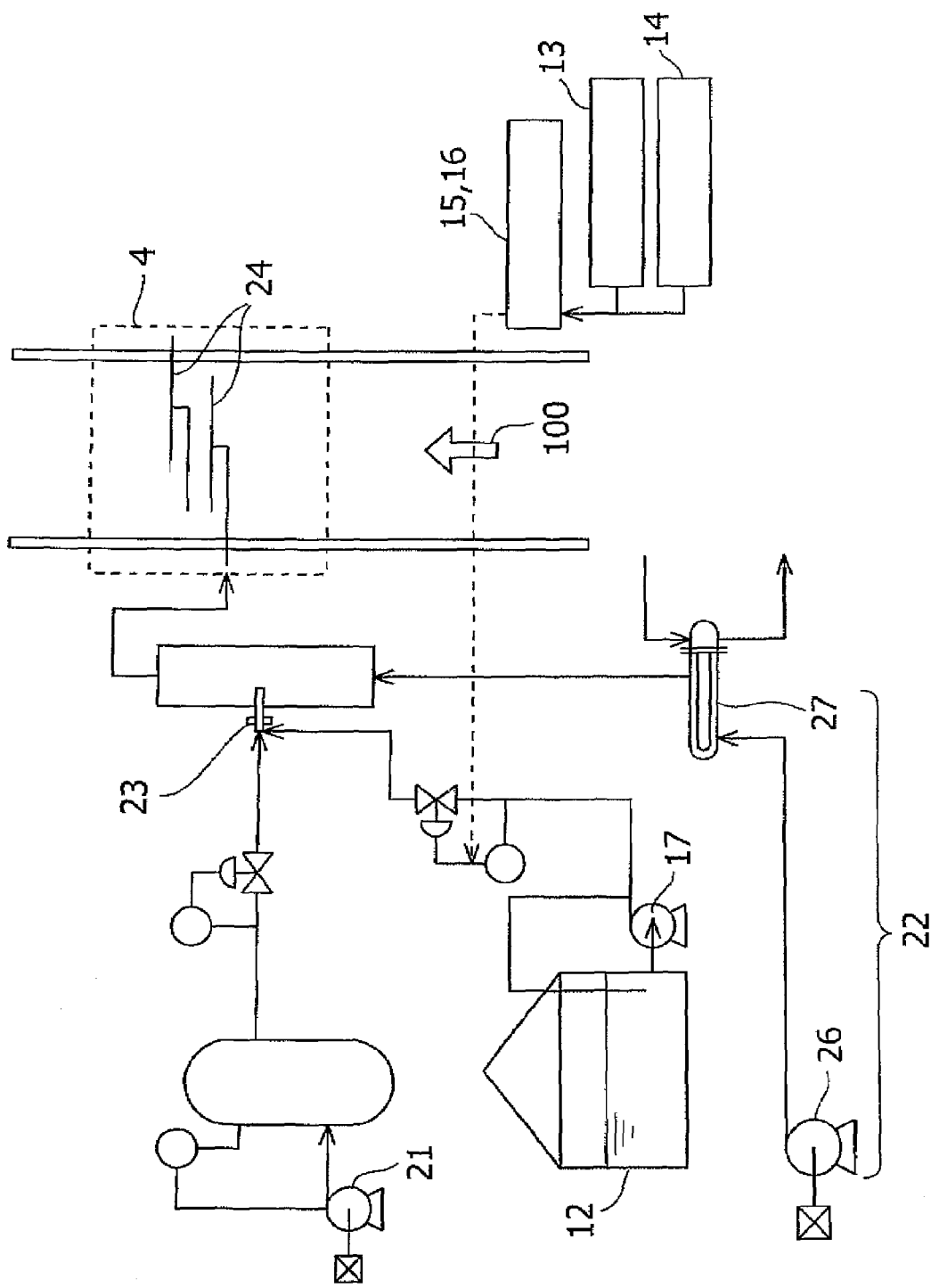
FIG. 2 illustrates an embodiment of the mercury chlorinating agent feed unit in the mercury removal system of the present invention.
Figure 3:
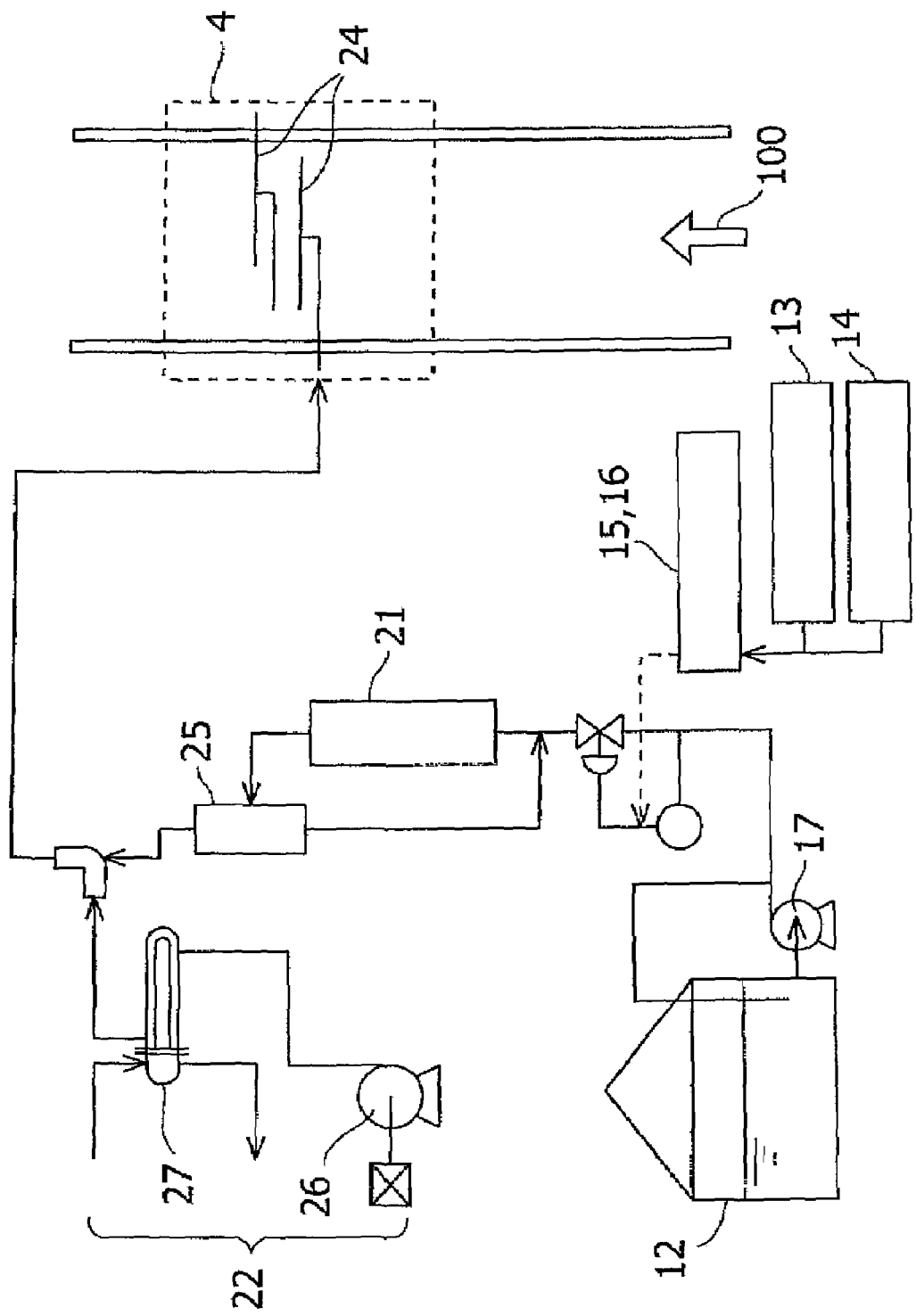
FIG. 3 illustrates another embodiment of the mercury chlorinating agent feed unit in the mercury removal system of the present invention.

FIGS. 2 and 3 each illustrates respective embodiments of the mercury chlorinating agent feed unit in the mercury removal system of the present invention.

In the embodiment of FIG. 2, an aqueous HCl solution of normal temperature which has been stored in a solution tank 12 is fed to an atomizing nozzle 23 by using a solution feed pump 17 and then sprayed and gasified by the aid of compressed air fed from an atomization air compressor serving as the gasifying unit 21. The compressed air thus fed has been heated in advance to a predetermined temperature, usually from 50 to 60° C. Tank of non-gaseous agent for mercury chlorination 12 is shown in FIG. 2.

The sprayed and gasified hydrogen chloride is fed into a pipe in which heated air for dilution has been fed and distributed by a dilution unit 22, whereby hydrogen chloride/water/air mixed gas having a predetermined concentration can be prepared. The obtained mixed gas of hydrogen chloride/water/air is dispersed into the flue with a distributor 24 similar to that used for $NH_3$ atomization and is atomized uniformly in a mercury-containing exhaust gas stream 100. Dilution air heater 27 is shown in FIG. 2.

In the embodiment of FIG. 3, an aqueous hydrogen chloride solution of normal temperature which has been stored in the solution tank 12 is fed to hydrogen chloride carburetor serving as the gasifying unit 21 by using a solution feed pump 17 to obtain a mixed gas of hydrogen chloride and water vapor. The resulting mixed gas is fed, via a gas-liquid separator 25, to a pipe in which heated air for dilution has been fed and distributed by the dilution unit 22 to prepare hydrogen chloride/water/air mixed gas having a predetermined concentration. The resulting hydrogen chloride/water/air mixed gas has usually a temperature of from 70 to 80° C.

The temperature of the heated air for dilution in FIGS. 2 and 3 is relatively lower than that of the conventional one and is usually from 90 to 150° C.

The hydrogen chloride gas concentration in the hydrogen chloride/water/air mixed gas to be fed to the flue during atomization of HCl is preferably from 1 to 10 vol. %. The preferable lower limit is 2 vol. %.

In the embodiment illustrated in FIG. 2 or FIG. 3, the HCl concentration in the flue during atomization into the flue can be controlled easily by controlling the flow rate of the air for dilution or a feed flow rate for the HCl solution.

Since the highly-corrosive aqueous hydrogen chloride solution is atomized or gasified at a relatively low temperature, an atomization nozzle, feed pipe, or distributor can be made of ordinarily employed materials. In particular, a distributor which has already been put into practical use for atomization of $NH_3$ can be employed so that a design cost can be reduced and in addition, the use of such a distributor capable of atomizing a gas facilitates uniform mixing with exhaust gas.

The embodiment in FIG. 2 features easy control of a flow rate, while the embodiment in FIG. 3 features excellent stability. It is also one of the embodiment of the present invention that the embodiment of FIG. 3 is used for feeding at a base flow rate in combination with the embodiment of FIG. 2 is used for feeding at a controlled flow rate.

Figure 4:
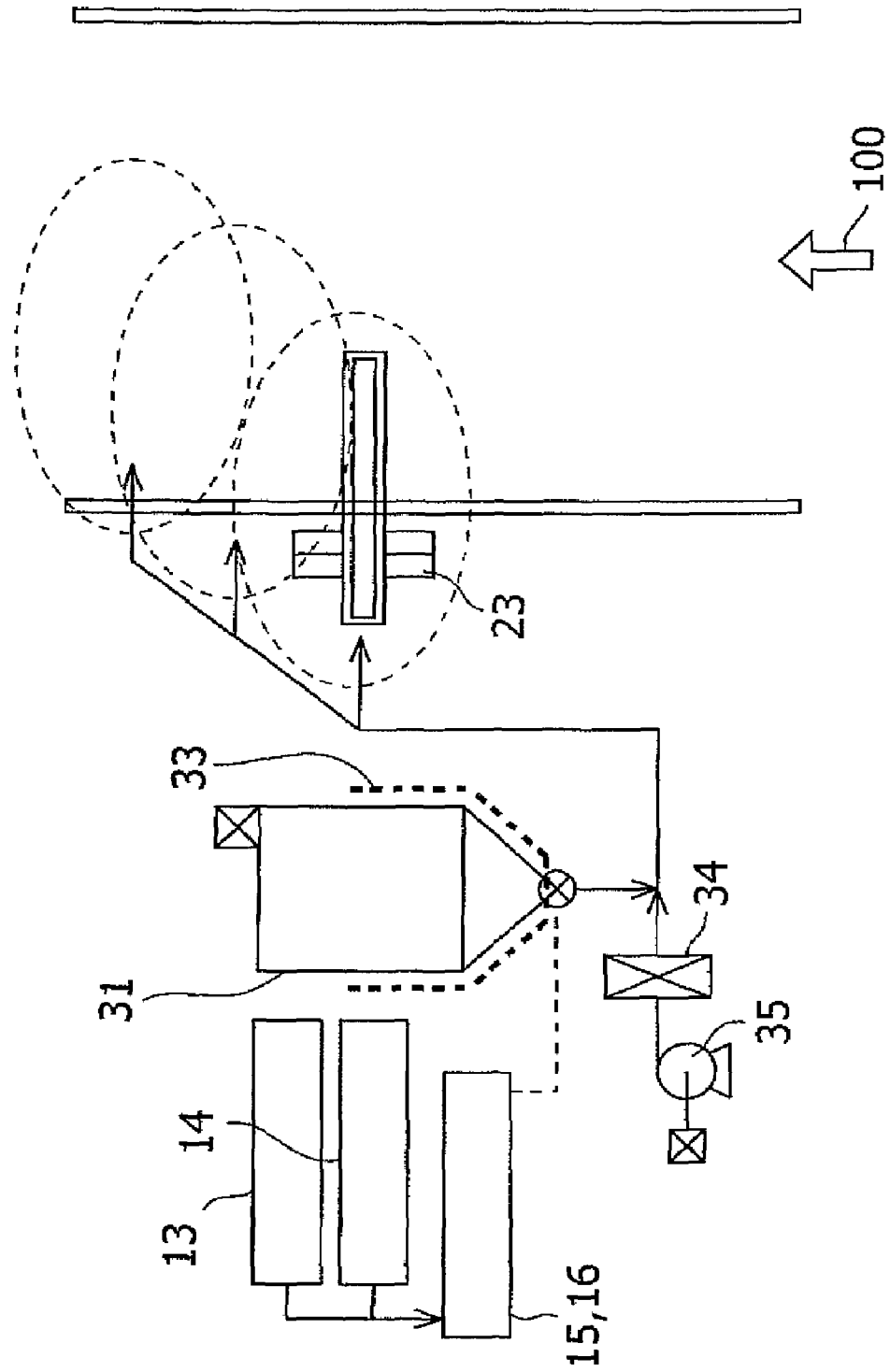
FIG. 4 illustrates a further embodiment of the mercury chlorinating agent feed unit in the mercury removal system of the present invention.
Figure 5:
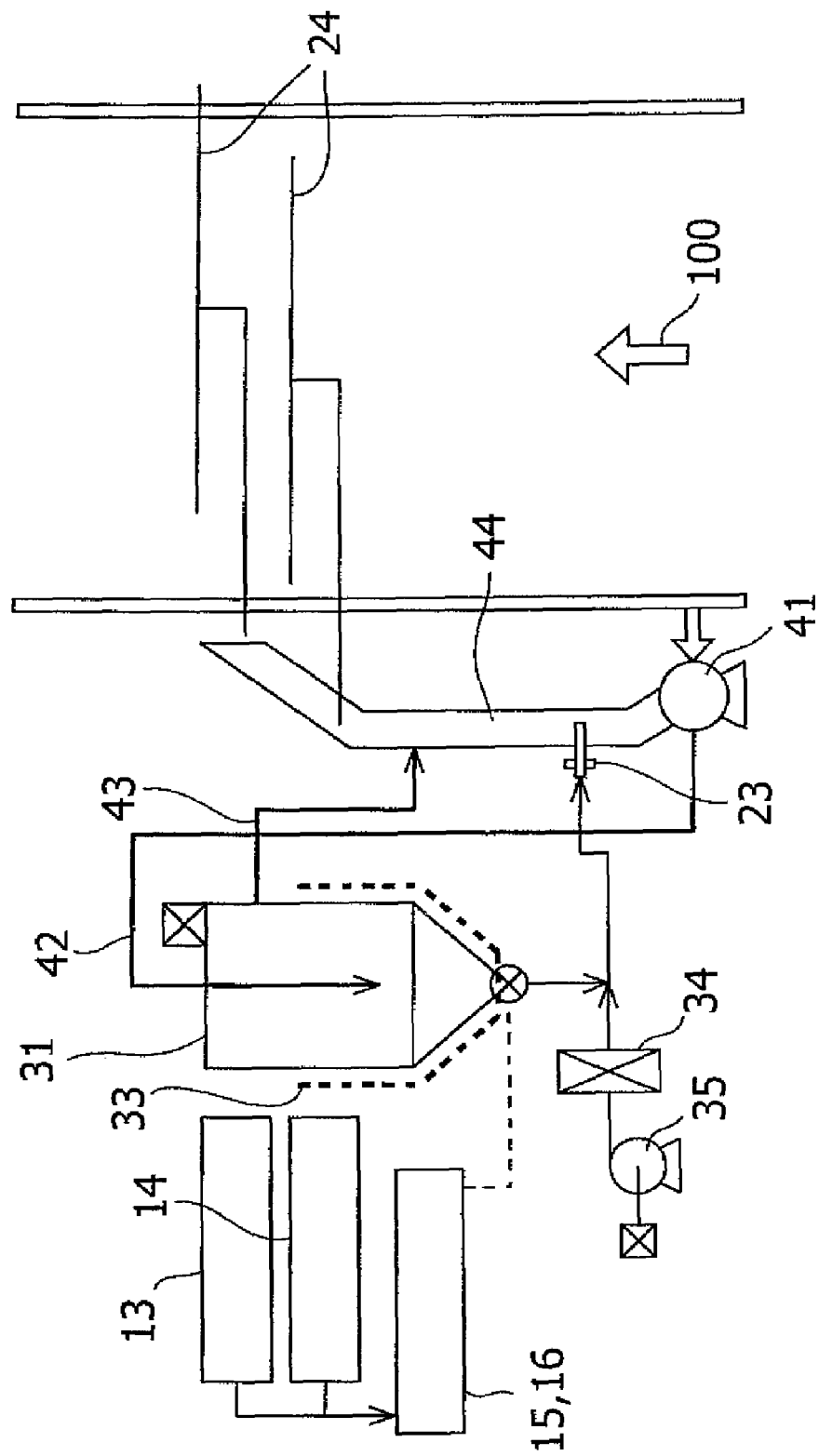
FIG. 5 illustrates a still further embodiment of the mercury chlorinating agent feed unit in the mercury removal system of the present invention.

FIGS. 4 and 5 each illustrates other embodiment of a mercury chlorinating agent feed unit in the mercury removal system of the present invention.

In the embodiment of FIG. 4, $NH_4Cl$ powder fed from a powder silo 31 is directly atomized and fed to the flue from an atomization nozzle by the aid of compressed air brought via an air drier 34 from a powder blower 35.

The $NH_4Cl$ concentration in the $NH_4Cl$/air mixture fed to the flue is preferably from 1 to 50 mass %.

The $NH_4Cl$ powder fed to the flue is heated in the flue and then, sublimed and decomposed into HCl which is a chlorinated product and $NH_3$.

The sublimation and decomposition reaction of the $NH_4Cl$ powder is an endothermic reaction so that the powder silo 31 is preferably heated in advance by a heater 33. A higher temperature of the heater 33 is better for the decomposition reaction. The temperature of the heater usually ranges from 150 to 300° C. in consideration of the heat resistant temperature of materials used for apparatuses such as powder silo and pipes.

In the embodiment of FIG. 5, a portion of a high-temperature exhaust gas 42 is drawn from a flue by a suction blower 41, and sent to and retained in a silo 31 for feeding $NH_4Cl$ powder. This exhaust gas, in cooperation with the heater 33, promotes heating and sublimation of the $NH_4Cl$ powder. The temperature of the drawn high-temperature exhaust gas 42 is usually from 350 to 420° C.

The retention time of the high-temperature exhaust gas 42 in the silo 31 is usually from several seconds to several minutes. The preferable upper limit is 5 minutes and preferable lower limit is 3 seconds.

A portion of $NH_4Cl$ thus sublimed in the silo is, together with the exhaust gas, refluxed (43) to a high-temperature gas pipe 44. A mixed gas of hydrogen chloride/ammonia/exhaust gas obtained in the high temperature gas pipe 44 is atomized into the flue through a distributor 24. Partially refluxed gas 43 is shown in FIG. 5.

The concentration of hydrogen chloride in the mixed gas of hydrogen chloride/ammonia/exhaust gas thus fed to the flue is preferably from about 1 to 50 mass %.

The $NH_4Cl$ which has remained unsublimed in the silo is directly atomized and fed into the flue from an atomization nozzle 23 by the aid of compressed air similar to the embodiment of FIG. 4.

The retention time of the high-temperature exhaust gas in the high-temperature gas pipe 44 is usually from several seconds to several hundred seconds. The preferable upper limit is 100 seconds, while the preferable lower limit is 3 seconds.

The average particle size of the $NH_4Cl$ powder used in the embodiment of FIG. 4 or FIG. 5 is usually 10 mm or less. From the viewpoint of rapid gasification in the flue or rapid gasification in the pipe into which the high-temperature exhaust gas drawn from the flue is distributed, a smaller average particle size is preferred. The more preferable upper limit can be set at 1 mm or less.

$NH_4Cl$ powder used in the embodiment of FIG. 4 or FIG. 5 is a neutral salt which causes less corrosion. In addition to easy handling, it enables use of lower quality materials for feed pipes and the like.

In addition, $NH_4Cl$ powder can supply therefrom a portion of HCl and also $NH_3$ for denitration. Use as a denitration gas can therefore reduce the consumption amount and cost of a denitration liquid $NH_3$.

In the embodiments shown in FIGS. 4 and 5, control of a feed flow rate of $NH_4Cl$ powder by means of a flow rate of air fed from the powder blower 35 facilitates control of an HCl concentration in the flue during atomization into the flue.

Figure 6:
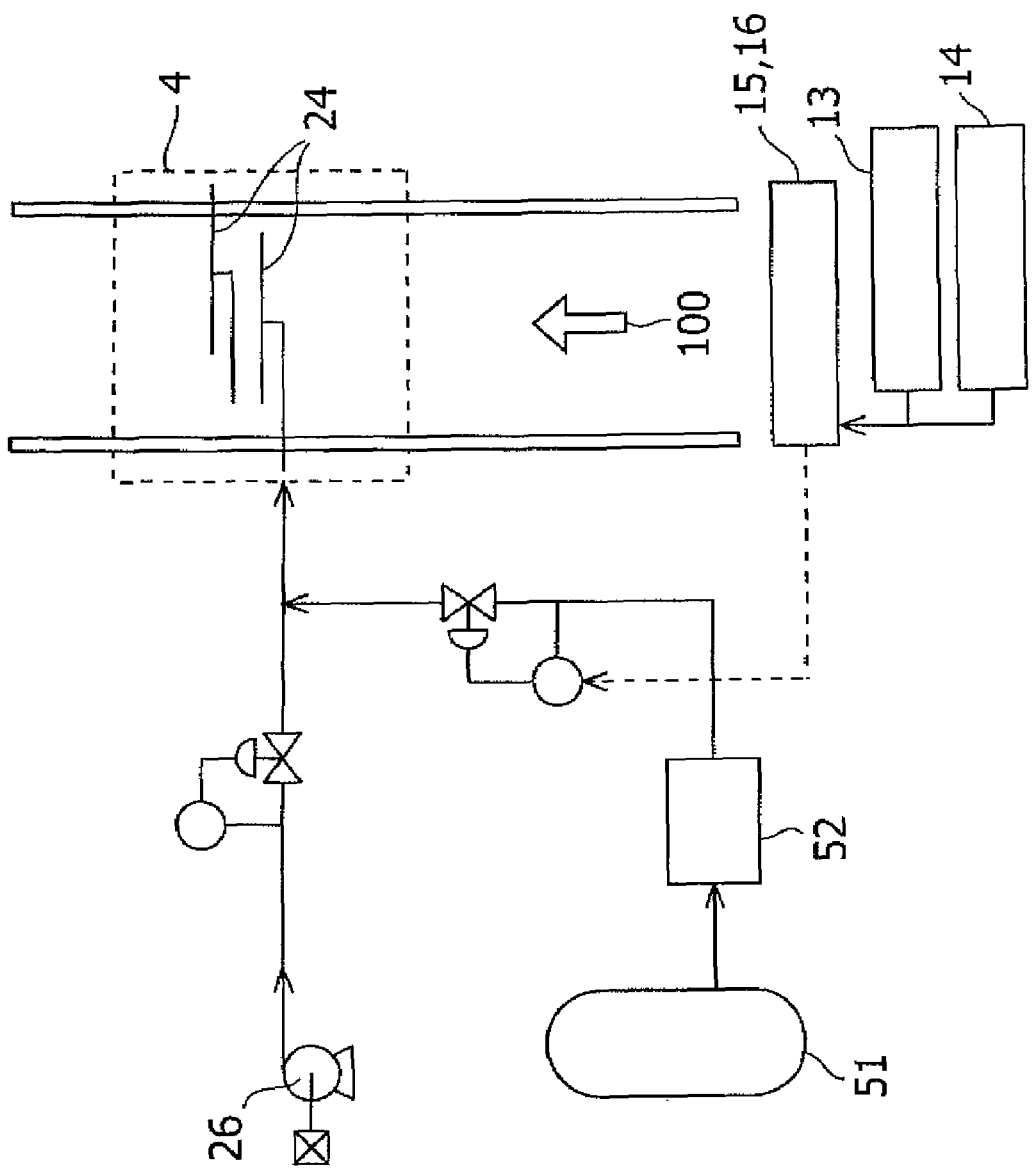
FIG. 6 illustrates a still further embodiment of the mercury chlorinating agent feed unit in the mercury removal system of the present invention.

In the embodiment of FIG. 6, liquefied chlorine fed from a chlorine cylinder 51 is heated to about 40° C. by a chlorine carburetor 52 and gasification of it is accelerated.

The gasified chlorine is fed into the pipe in which air fed from a dilution air fan 26 has been distributed, whereby a chlorine/air mixed gas having a predetermined concentration can be obtained. The resulting chlorine/air mixed gas is distributed in the flue and uniformly atomized into a mercury-containing exhaust gas stream 100 by a distributor 24 similar to that employed for atomization of $NH_3$.

The mercury removal system of the present invention can be adopted for the treatment of exhaust gases discharged from combustion equipment of a thermal power plant for burning mercury-containing fossil fuels such as coal or heavy oil.

While the present invention has been described in terms of the preferred embodiments, those skilled in the art will recognize that the present invention can be practiced with modification within the spirit and scope of the appended claims.

What is claimed is:

1. A process for removing mercury from a mercury-containing exhaust gas containing nitrogen oxides, sulfur oxides and mercury, which comprises:
feeding a mercury chlorinating agent to a flue exhaust gas containing nitrogen oxide, sulfur oxide and mercury;
carrying out reductive denitration in the presence of a solid catalyst; and
desulfurizing in wet process with an alkaline absorbing solution,
wherein the step of feeding a mercury chlorinating agent further comprises a step of:
gasifying a non-gaseous agent for mercury chlorination which is in the non-gaseous form at normal temperature and normal pressure prior to the feed into the flue;
measuring the concentration of the gaseous agent for mercury chlorination upstream of a desulfurization unit in the flue;
calculating an initial concentration of the gaseous agent for mercury chlorination to be fed by a mercury chlorinating agent feed unit based on the measured concentration of the gaseous agent for mercury chlorination; and
controlling an amount of the non-gaseous agent for mercury chlorination to be fed into the flue based on the calculated initial concentration.

2. The process for removing mercury from a mercury-containing exhaust gas in claim 1, wherein the step of feeding a mercury chlorinating agent further comprises a step of diluting the gaseous agent for mercury chlorination, which is obtained using the gasifying step.

3. The process for removing mercury from a mercury-containing exhaust gas in claim 2, wherein the step of diluting the gaseous agent comprises using compressed air.

4. The process for removing mercury from a mercury-containing exhaust gas in claim 3, further comprising heating the compressed air before diluting the gaseous agent.

5. The process for removing mercury from a mercury-containing exhaust gas in claim 1, which further comprises:
measuring the mercury concentration at the upstream or downstream of the desulfurization unit in the flue; and
calculating the initial concentration to be fed with the mercury chlorinating agent feed unit by using either one of measured value of the mercury concentration or the measured value of the gaseous agent for mercury chlorination as a master control parameter and an other one as a slave parameter.

6. A system for removing mercury from a mercury-containing exhaust gas containing nitrogen oxides, sulfur oxides and mercury, which comprises:
a mercury chlorinating agent feed unit for feeding a mercury chlorinating agent to a flue exhaust gas,
a reductive denitration unit for reducing the nitrogen oxides,
a desulfurization unit for removing the sulfur oxides, and
a concentration measuring unit of the gaseous agent for mercury chlorination disposed upstream of the desulfurization unit,
wherein the mercury chlorinating agent feed unit further comprises a heating unit for heating a non-gaseous agent for mercury chlorination which is in a non-gaseous form under normal temperature and normal pressure, or a gasifying unit for obtaining a gaseous agent for mercury chlorination from the non-gaseous agent for mercury chlorination, wherein the gasifying unit uses compressed air heated to a predetermined temperature.

7. The system for removing mercury from a mercury-containing exhaust gas in claim 6, wherein a portion of the exhaust gas is used as a gasifying agent.

8. The system for removing mercury from a mercury-containing exhaust gas in claim 6, wherein the mercury chlorinating agent feed unit is equipped further with a unit for diluting the gaseous agent for mercury chlorination.

9. The system for removing mercury from a mercury-containing exhaust gas in claim 6, which further comprises:
a calculation unit for calculating an initial concentration of the gaseous agent for mercury chlorination to be fed by the mercury chlorinating agent feed unit based on the concentration of the gaseous agent for mercury chlorination measured or the flow rate of a heated air for dilution to be fed by a dilution unit; and
a control unit for controlling an amount of the non-gaseous agent for mercury chlorination to be fed into the flue based on the initial concentration calculated.

10. The system for removing mercury from a mercury-containing exhaust gas in claim 6, wherein the non-gaseous agent for mercury chlorination is any one of ammonium chloride in a solid form, an aqueous hydrogen chloride solution or liquid chlorine.

11. The system for removing mercury from a mercury-containing exhaust gas in claim 6, which further comprises:
a calculation unit for calculating an initial concentration of the gaseous agent for mercury chlorination to be fed by the mercury chlorinating agent feed unit based on the mercury concentration measured by the measuring unit; and
a control unit for controlling an amount of the non-gaseous agent for mercury chlorination to be fed into the flue based on the initial concentration calculated by the calculation unit.

* * * * *